United States Patent [19]
Grow

[11] 3,941,970
[45] Mar. 2, 1976

[54] FEED ROLL AND METHOD OF IMPARTING A ROUGH TEXTURE TO THE SURFACE THEREOF

[75] Inventor: Arthur Larry Grow, Versailles, Ohio

[73] Assignee: Precision Tool & Machine Co., New Bremen, Ohio

[22] Filed: May 13, 1974

[21] Appl. No.: 469,420

[52] U.S. Cl. .............................. 219/69 R; 219/69 M
[51] Int. Cl.² ............................................. B23K 9/16
[58] Field of Search 219/10.69 M, 10.69 V, 10.69 E, 219/10.69 G, 10.69 R

[56] References Cited
UNITED STATES PATENTS

| | | | |
|---|---|---|---|
| 2,416,125 | 2/1947 | Simpson | 219/69 M |
| 3,145,286 | 8/1964 | Fehling et al. | 219/69 M |
| 3,301,776 | 1/1967 | Hughes | 219/69 X |
| 3,562,702 | 2/1971 | Celorsky | 219/69 M |
| 3,600,546 | 8/1971 | Niwa et al. | 219/69 M |
| 3,671,706 | 6/1972 | Littrell | 219/69 M |
| 3,782,618 | 1/1974 | Voorhees | 226/155 |
| 3,800,117 | 3/1974 | Anderson | 219/69 E |
| 3,858,432 | 1/1975 | Voorhees et al. | 72/455 |

*Primary Examiner*—Bruce A. Reynolds
*Attorney, Agent, or Firm*—Albert L. Jeffers; Roger M. Rickert

[57] ABSTRACT

A feed roll, especially for feeding strip stock, and a method of imparting a roughened texture to the surface thereof, in which the roll is formed of hardened steel and the peripheral surface which engages and feeds the strip stock is treated by electrical discharge machining to impart a roughness to the surface. The roughness is in the form of a textured surface often having a finish ranging from about 175 microinches RMS to about 325 microinches RMS and is preferably within the range of about 250 microinches RMS for many applications. Requirements also exist for rougher and smoother feed roll finishes that can be controllably produced by this process.

2 Claims, 4 Drawing Figures

FEED ROLL AND METHOD OF IMPARTING A ROUGH TEXTURE TO THE SURFACE THEREOF

The present invention relates to feed rolls and to a method of making a feed roll and especially in respect of a method of imparting a roughened texture to the surface of the feed roll.

Feed rolls are widely used for feeding strip stock into machine tools, especially presses, and are required to grip the stock being fed with a substantial degree of friction without, however, damaging the strip stock in any way. The feeding of stock into a press is intermittent, at least along the region of the strip stock immediately adjacent the press, and with modern extremely high speeds of operation of presses, the feed rolls adjacent the press must start and stop up to several times a second.

The rapid starting and stopping of the feed rolls tends to induce slippage between the rolls and the strip stock which causes an error in the length of stock fed on each feeding cycle. It has been attempted to impart a roughened surface texture to feed rolls as by sand blasting or shot blasting the rolls and then giving the rolls a hard finish as by plating the rolls with chromium. These rolls, while improved over plain steel rolls, are expensive and troublesome to produce, and experience a fairly rapid wear of the plated surface.

With the foregoing in mind, it is the primary objective of the present invention to provide a feed roll and a method of imparting rough surface texture to the feed roll which results in an improved product having longer life than has been obtainable heretofore, and at a lower cost.

Another object of the present invention is the provision of imparting a roughened surface texture to a feed roll in which the feed roll is simultaneously brought to the exact size desired.

A still further object of the present invention is the provision of a method of making a feed roll and imparting a roughened surface texture thereto in which the advantages of hard steel for at least the surface region of the roll can be taken advantage of.

BRIEF SUMMARY OF THE INVENTION:

According to the present invention, a feed roll is formed of hardenable steel and is hardened. Such a roll usually comprises a cylindrical central section formed accurately to a predetermined diameter, with a tapered bore through the center of the roll to permit it to be securely mounted on a shaft for the support and driving of the roll. The roll according to the present invention is made of a hardenable steel and is then hardened and then may, at this time, be ground to a predetermined diameter.

Thereafter, the entire peripheral surface of the roll, or at least that portion thereof which is to engage the strip stock, is subjected to electrical discharge machining (EDM) which will roughen the surface in a controlled manner.

In brief, EDM treatment of the surface results in the formation of tiny pits therein distributed uniformly over the entire peripheral extent of the feeding surface of the roll. The surface texture can be formed in an already hardened roll as easily as it can be formed into a roll prior to hardening so that the advantage exists of being able to manufacture and size the roll preparatory to the treatment of the peripheral surface of the roll.

At the same time, the EDM treatment of the roll can, if desired, be employed to reduce the roll diameter to a predetermined exact size in the event the roll is manufactured slightly larger than desired.

The objects referred to above as well as other objects and advantages of the present invention will become more apparent upon reference to the following detailed specification taken in connection with the accompanying drawings in which.

Figure 1:
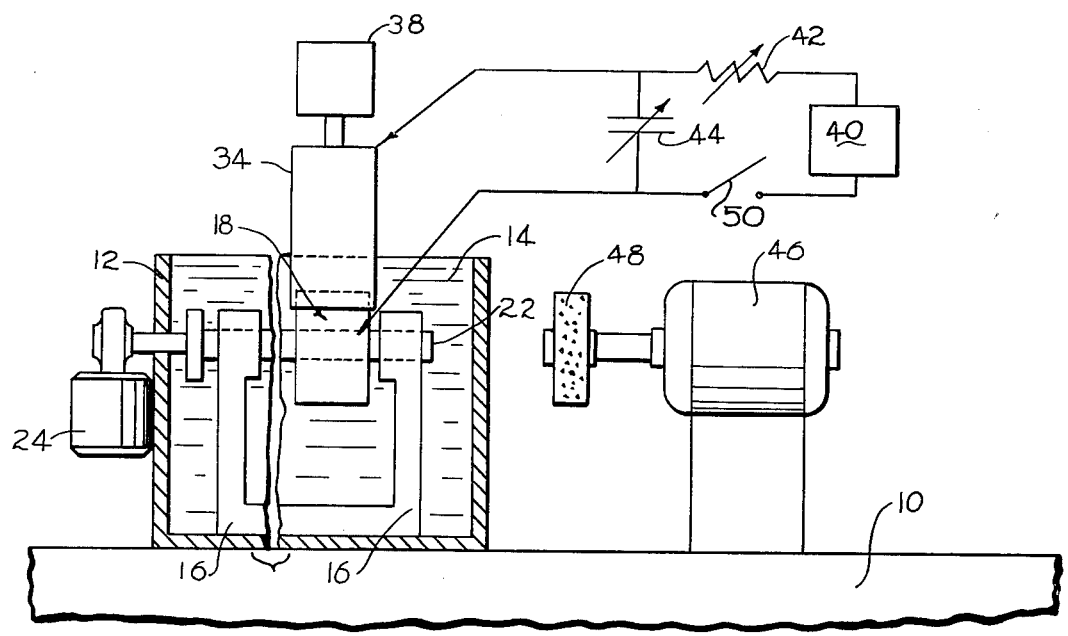
FIG. 1 is a schematic representation of an apparatus for electrical discharge treatment of a roll surface.

DETAILED DESCRIPTION OF THE INVENTION:

Referring to the drawings somewhat more in detail, the apparatus shown in FIG. 1 comprises a stationary bed 10 on which is mounted a tank 12 containing a dielectric liquid 14. A support 16 in the tank rotatably supports feed roll 18 which has a peripheral feed surface 20 and is mounted on shaft 22 for rotation in support 16. Shaft 22 is connected to a drive motor 24 for driving the roll in rotation while it is in tank 12.

An electrode member 34 is vertically displaceable by control unit 38.

A source of electrical energy is provided and it may be of different types but is shown herein as a direct current source 40 having one side connected through an adjustable resistor 42 to one side of a capacitor 44 and also to electrode 34. The other side of source 40 is connected to the other side of capacitor 44 and also to feed roll 18.

There may also be mounted on table 10 a motor 46 connected for driving a grinding wheel 48 which can be employed for truing up the end of the electrode which faces the peripheral surface 20 of roll 18.

It would also be possible to arrange electrode 34 to traverse axially relative to the feed roll if it is desired to finish a feed roll whose length is greater than the axial dimension of the electrode.

In operation, the roll is rotated while the switch 50 is closed to connect source 40 across capacitor 44. The result of closing switch 50 is to cause capacitor 44 to charge up at a rate dependent on the size and adjustment of resistor 42, and when the capacitor reaches a predetermined voltage, the energy stored therein will discharge across the gap between electrode 34 and surface 20 of feed roll 18.

The rate at which pulses are thus supplied to electrode 34 may vary over a wide range, for example, from about 5,000 cycles per second up to 100,000 cycles per second or more. The voltage at which the pulses are supplied to electrode 34 is dependent upon the radial spacing between surface 20 of the feed roll 18 and the opposed end of electrode 34. This spacing is referred to as overcut and the spacing may vary from less than one thousandth of an inch up to several thousandths of an inch, but is automatically controlled during operation by control unit 38 of the EDM machine. In general, the longer the gap, the greater the voltage that is required to drive a spark across the gap.

What happens to EDM treatment of the surface is that each spark contains a discrete, measured, and controllable amount of energy so that the metal removal rate and the resulting surface finish can be predicted. Each spark normally produces a small crater on both the workpiece and the tool, with the crater on the tool normally being substantially smaller than that which is formed on the workpiece surface.

The energy for removal of metal from the workpiece comes primarily from the heat generated from the spark. The metal is probably first melted and is ejected from the workpiece by the impact of the spark and may even be vaporized and then solidifies and forms the chip that is removed from the working area. The chips may be removed or flushed away as the feed roll 18 rotates in the dielectric liquid 14 or by supplying additional dielectric liquid between the electrode and the surface of the roll through a conduit or other suitable means mounted adjacent the feed roll.

The feed roll can be hardened steel and no problems are encountered in connection with removal of material therefrom.

The electrode can be any of several materials, including aluminum, brass, copper, alloys of copper and tungsten, steel and graphite. For graphite and copper and brass, standard polarity is ordinarily employed and wherein the electrode forms the cathode and the work the anode. For some types of electrodes such as aluminum and copper tungsten alloy, the polarity is reversed and it may also be reversed when the electrode is graphite and when the electrode is steel.

The dielectric indicated at 14 may be oil or it may consist of a polar liquid such as triethylene glycol in water or glycerin in water. Polar liquids are generally preferred but oils can also be employed to no disadvantage.

It is of advantage to be able to dress the end of the electrode 34 in FIG. 1 facing the roll 18 and this can be done by moving the electrode into registration with grinding wheel 48 and grinding the end of the electrode to a true configuration. Curvature of the electrode need not match curvature of the feed roll, but the electrode surface should not be inclined relative to a straight line on the feed roll surface when a cylindrical surface is to be produced.

The process according to the present invention is relatively inexpensive because it is not necessary to remove a great deal of material from roll 18. In most cases, it is necessary merely to randomly pit the surface so that the surface is uniformly roughened throughout the peripheral extent thereof.

Figure 2:
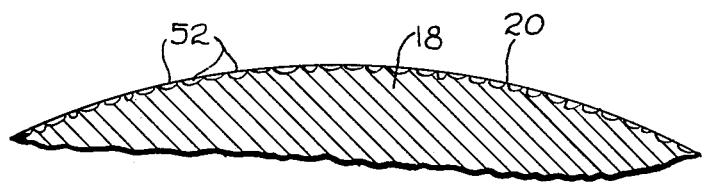
FIG. 2 is a greatly enlarged schematic view showing the appearance of the treated roll surface.

FIG. 2 shows a fragment of roll 18 drawn at increased scale and showing the pits 52 formed in the surface by the electrical discharge machining operation.

The pits or craters 52 are quite small and will, in general, not exceed about 0.001 of an inch in any direction, including depth. The actual size and depth of the pits or craters and the distribution thereof is, of course, determined by the amount of overcut, the frequency at which pulses are supplied to the electrode, the size of the capacitor employed, and the rate of relative movement between the workpiece and the electrode.

Figure 3:
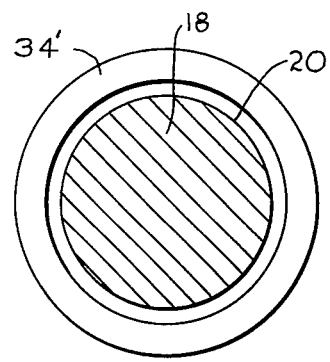
FIG. 3 is a modification showing the use of a ring-like electrode.

FIG. 3 shows how a ring-like electrode 34' could be employed for treating surface 20 of feed roll 18. The ring-like electrode around the feed roll could be moved relatively in the axial direction while, preferably, the feed roll is rotated so that the roughened texture is applied uniformly to the surface throughout the axial and peripheral extent thereof.

Figure 4:
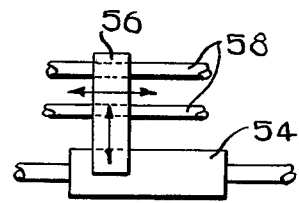
FIG. 4 is a fragmentary view showing how a roll longer than the electrode could be treated.

FIG. 4 shows a modification wherein the roll 54 being treated is substantially longer in the axial direction than electrode structure 56. The electrode structure 56 is moveable on guide rods 58 for traversing feed roll 54 from end to end while also being moveable vertically to vary in distance between the electrode and feed roll. The circuit of FIG. 1 could be employed in connection with the modification of FIG. 4.

Modifications may be made within the scope of the appended claims.

What is claimed is:

1. A feed roll formed of hardened steel, especially feeding strip stock into a machine tool, such as a press, and comprising, a steel body having a central axis of rotation and a peripheral surface concentric with said axis, wherein the improvement comprises EDM formed pits in said peripheral surface and distributed uniformly thereover in both the axial and circumferential directions, said EDM formed pits being on the order of about 250 microinches RMS, and said EDM formed pits imparting a roughness to said peripheral surface to enhance the gripping of the strip stock by said peripheral surface as the strip stock is intermittently fed to the press.

2. A feed roll formed of hardened steel, especially feeding strip stock into a machine tool, such as a press, and comprising, a steel body having a central axis of rotation and a peripheral surface concentric with said axis, wherein the improvement comprises EDM formed pits in said peripheral surface and distributed uniformly thereover in both the axial and circumferential directions, said EDM formed pits being in a range of about 175 microinches RMS to about 350 microinches RMS, and said EDM formed pits imparting a uniform roughness to said peripheral surface to enhance the gripping of the strip stock by said peripheral surface as the strip stock is intermittently fed to the press.

* * * * *